United States Statutory Invention Registration [19]

[11] Reg. Number: H857

Haas [43] Published: Dec. 4, 1990

[54] ELECTROLYTIC PROCESS FOR PREPARING URANIUM METAL

[75] Inventor: Paul A. Haas, Knoxville, Tenn.

[73] Assignee: The United States of America as represented by the United States Department of Energy, Washington, D.C.

[21] Appl. No.: 562,187

[22] Filed: Jul. 26, 1990

[51] Int. Cl.[5] ..... C25B 59/40

[52] U.S. Cl. ..... 204/1.5; 75/398; 75/399; 423/5; 423/19; 423/253; 423/254

[58] Field of Search ..... 35/112

*Primary Examiner*—Brooks H. Hunt
*Assistant Examiner*—Ngoclan T. Mai
*Attorney, Agent, or Firm*—Katherine P. Lovingood; Stephen D. Hamel; William R. Moser

[57] ABSTRACT

An electrolytic process for making uranium from uranium oxide using $Cl_2$ anode product from an electrolytic cell to react with $UO_2$ to form uranium chlorides. The chlorides are used in low concentrations in a melt comprising fluorides and chlorides of potassium, sodium and barium in the electrolytic cell. The electrolysis produces $Cl_2$ at the anode that reacts with $UO_2$ in the feed reactor to form soluble $UCl_4$, available for a continuous process in the electrolytic cell, rather than having insoluble $UO_2$ fouling the cell.

1 Claim, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ELECTROLYTIC PROCESS FOR PREPARING URANIUM METAL

This invention was developed pursuant to a contract with the U.S. Department of Energy.

This invention relates to a process for preparing uranium and more particularly an electrolytic process for preparing uranium using fluoride and chloride salt mixtures.

BACKGROUND OF THE INVENTION

A standard method for making uranium metal is the reduction of $UF_4$ with magnesium as a reducing agent. The high cost of such a process has directed efforts at alternatives. One alternative is the use of electrochemical methods similar to the Hall-Heroult process used in making aluminum. These approaches presented major difficulties.

First, the high density and low solubility of uranium oxides resulted in fouled cells that prevented metal coalescence. Also, less than 50% of recovered metal is from uranium oxides, the rest being from $UF_4$ which not only must first undergo conversion from the $UO_2$ form before electrolytic reduction, but also produces an undesirable $CF_4$ waste gas emission. The efficiencies are low, rarely exceeding 30% and usually lower than 20% for production from $UO_2$. Cell capabilities are low due to low current efficiencies and because the maximum current is limited by the "critical current density" that gives an "anode effect" when $CF_4$ is produced. Finally, in order to maintain continuous operation at 1200° C., consumed carbon anodes must be repeatedly replaced, a difficult and dangerous job.

Therefore there is a continuing need to develop new, safe and efficient process for making uranium metal.

SUMMARY OF THE INVENTION

In view of the above needs, it is an object of this invention to provide a process for making uranium that eliminates oxide fouling of the cell.

It is another object of this invention to provide a process for making uranium that has a high uranium yield and is thus more efficient than present processes.

An additional object of this invention is to provide an electrolytic process for making uranium wherein current capacities are maximized.

A further object of this invention is to provide a process for making uranium that is safe, having no hazardous by products.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the process of this invention may comprise: in an electrolytic cell having an anode and cathode electrodes, contacting in the molten state uranium chloride and a mixture of salts comprising chloride salts of metals selected from the group consisting of K, Na and Ba, the fluoride salts of metals selected from the group consisting of K, Na and Ba in sufficient amounts to minimize volatility of uranium chlorides; and introducing an electric current across the electrodes thus resulting in the production of uranium metal. This process is safer and more efficient than prior electrolytic processes.

DETAILED DESCRIPTION OF THE PREFERRED EMBODIMENT

The theory of this invention is to produce at one electrode a byproduct that can be recycled to a feed reactor containing $UO_2$ feed material to produce a uranium compound that can be electrolytically reduced, thus eliminating the problem of having $UO_2$ in the reaction vessel and also recycling a byproduct. The composition of the reactants is formulated so that $Cl_2$ forms at the anode. This reacts with $UO_2$ in a the feed reactor to form uranium chlorides as the uranium compounds to be reduced.

The anode reaction is $$4Cl^- \rightarrow 2Cl_2 + 4e$$

The reaction at the cathode is $$U^{+4} + 4e \rightarrow U^\circ$$

The net overall cell reaction is $$UCl_4 \rightarrow 2Cl_2 + U^\circ$$

The reactions listed using uranium chlorides are known and were used in batch-type processes to prepare dendritic uranium metal solids at 750° to 900° C. The process was inefficient and uneconomical because of the large amount of waste solids and the steps for recovery of the uranium metal powder. Operations to prepare molten uranium were not practical because of the excessive volatility of uranium chlorides.

To get around that problem, the cell charge is a mixture of chloride and fluoride salts with one or more of the fluoride salts selected to give a high degree of conversion of uranium chlorides to uranium fluorides. The preferred fluoride is KF and some conversion reactions are $$4KF + UCl_4 \rightarrow 4KCl + UF_4$$

$$3KF + UCl_3 \rightarrow 3KCl + UF_3$$

Thermodynamic data shows a value of $-255$ Kj/mol $UCl_4 = \Delta G^\circ = -RT \ln K_f$ at 1500° C. for the first reaction. This value indicates a very high equilibrium conversion to KCl and $UF_4$ and results in a very fast conversion in the molten cell charge. Other possible fluoride salts for exchange with uranium chlorides are NaF and $BaF_2$, however, NaCl is more volatile than KCl, and the exchange reaction with $BaF_2$ is less favorable thermodynamically.

Another reason to use the salt mixture is that it will have a lower melting point resulting in easier more convenient operation. The composition is selected so that $UCl_4$ concentration in the melt is low to enable the cell to be operated above the boiling point of $UCl_4$ without the production of excessive amounts of $UCl_4$ vapor. Because the chlorine is in the melt, as KCl, the anode product is $Cl_2$ in spite of the low $UCl_4$ concentration.

The electrode reaction depend on the ions present at the electrode and not on the melt constituents that do not ionize. The KCl and $UF_4$ and $UF_3$ all ionize. The anode reaction to form $Cl_2$ occurs first and the undesirable reaction of $F^-$ to form $CF_4$ requires a higher voltage and does not occur until the chloride at the anode is depleted to a low concentration. At the cathode, U metal is formed in preference to K metal. The net reactions in the cell when the uranium is mostly $UF_4$ are $$UF_4+4KCl \rightarrow 2Cl_2+U^\circ+4KF$$

$$UF_3+3KCl \rightarrow 3/2Cl_2+U^\circ+3KF$$

In combination with the exchange reactions for KF with uranium chloride feed, the net reactions starting with uranium chloride feed are $$UCl_4 \rightarrow 2Cl_2+U^\circ$$

$$UCl_3 \rightarrow 3/2Cl_2+U^\circ$$

One reaction for chloride recycle in a chlorinator is $$UO_2+2Cl_2+2CO \rightarrow UCl_4+2CO_2$$

Then the overall net process reaction is $$UO_2+2CO \rightarrow 2CO_2+U^\circ$$

This process provides many benefits over prior art processes. Uranium fluoride and chlorides are molten and soluble in the cell melt at 1200° C.; therefore, there are no interfering solids to foul the cell. The cell can be operated without $UF_4$ feed material or having to deal with $CF_4$ waste. The current efficiencies are higher since low efficiencies can be attributed to parasitic $U(III) \longleftrightarrow U(IV)$ cycle and large amounts of $UF_4$ needed to give useful solubilities $UO_2$. Lower $UF_4$ concentrations and resulting higher current efficiencies are possible when the anode product is $Cl_2$. Higher anode current densities and higher cell capacities are possible with $Cl_2$as the anode product since $Cl_2$ does not give the critical anode effect that occurs when $CF_4$ is a product. In addition, the carbon anode is not consumed as it is when CO and $CF_4$ are the anode product. This allows for a continuous process for uranium manufacture since the anode does not need to be periodically replaced.

I claim:

1. A process for making uranium comprising, in an electrolytic cell having anode and cathode electrodes, contacting in the molten state uranium chloride and a mixture of salts comprising chloride salts of metals selected from the group consisting of K, Na and Ba, and fluoride salts of metals selected from the group consisting of K, Na and Ba in sufficient amounts to minimize volatility of uranium chlorides; and introducing an electric current across the electrodes thus resulting in the production of uranium metal.

* * * * *